United States Patent Office 3,639,592
Patented Feb. 1, 1972

3,639,592
METHODS FOR DESTROYING NEMATODES WITH O,O - DIETHYL S - [(CHLORO-SUBSTITUTED ALLYL) THIOMETHYL] PHOSPHOROTHIOATES
John P. Chupp, Kirkwood, and Robert L. Balske, Creve Coeur, Mo., assignors to Monsanto Company, St. Louis, Mo.
No Drawing. Filed Sept. 19, 1969, Ser. No. 859,563
Int. Cl. A01n 9/36
U.S. Cl. 424—216               3 Claims

ABSTRACT OF THE DISCLOSURE

Nematocidal usage of O,O-diethyl S-[(chloro substituted allyl) thiomethyl] phosphorothioates.

---

This invention relates to the nematocidal usage of O,O-diethyl S-[(chloro substituted allyl) thiomethyl] phosphorothioates of the formula

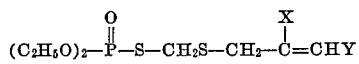

wherein X and Y are unlike members of the group chlorine and hydrogen. These oily materials and the preparation thereof are described in U.S. 3,080,276.

To illustrate the activity of the compounds of this invention is the following:

To two separate aqueous suspensions respectively containing 30 p.p.m. of O,O-diethyl S-(3-chloroallylthiomethyl) phosphorothioate and 30 p.p.m. of O,O-diethyl S-(2-chloroallylthiomethyl) phosphorothioate in glass vials is added freshly hatched larvae of the vinegar eel worm, *Turbatrix aceti*, and the vials stoppered. After 7 days at room temperature complete destruction was observed in each case. In contrast 0,0-diethyl S-(3,3-dichoroallylthiomethyl) phosphorothioate (an amber oil described in U.S. 3,080,276) at the same concentration and under the same evaluating conditions was completely inactive.

The compounds of this invention are active against nematode species of the genus Meloidogyne, e.g. at a concentration of 1.0 p.p.m. O,O-diethyl S-(3-chloroallylthiomethyl) phosphorothioate gave a 100% kill of *Meloidogyne incognita* v. *acrita*. This phosphorothioate was also highly effective in the control of *Meloidogyne javanica* (tomato root knot nematode) and *Heterodera schactii* (sugar beet nematode).

In actual usage the compounds of this invention are added to the soil in solution, as an emulsion or water dispersion but preferably are added in a solid formulation wherein the active nematocide is to be distributed over some dry and permanently free-flowing powder such as the clays, including bentonite and attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will be course attack the soil phase of the life cycle of nematode parasites which infest animals. Treating barnyards, chicken pens, stable and other infested areas destroys eggs and infestive larvae of many parasites which infest animals.

In the use of the compounds of this invention as nematocides the active compound, diluted or undiluted, can be applied to the soil at rates of 5 to 100 pounds per acre. The preferred application for treating soils of average nematode infestation will be from 10 to 50 pounds per acre. The formulation may contain dispersants which aid uniform distribution.

What is claimed is:
1. The method of destroying the soil phase of nematode parasites which comprises incorporating in the nematode infested soil a nematocidally effective amount of an O,O-diethyl phosphorothioate of the formula

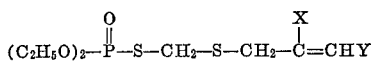

wherein X and Y are unlike members of the group consisting of chlorine and hydrogen.
2. The method of claim 1 wherein the O,O-diethyl phosphorothioate is incorporated at the rate of 5 to 100 pounds per acre.
3. The method of claim 1 wherein the nematode is a species of the genus Meloidogyne.

References Cited
UNITED STATES PATENTS
3,080,276   3/1963   Chupp _____ 424—216

ALBERT T. MEYERS, Primary Examiner
L. SCHENKMAN, Assistant Examiner